United States Patent

Olson et al.

[15] 3,692,918

[45] Sept. 19, 1972

[54] AUTOMATIC REGISTRATION OF COLOR TELEVISION CAMERAS

[72] Inventors: Charles Langdon Olson, Oaklyn; Robert Adams Dischert, Burlington, both of N.J.

[73] Assignee: RCA Corporation

[22] Filed: May 17, 1971

[21] Appl. No.: 143,794

[52] U.S. Cl. ....................178/5.4 M

[51] Int. Cl. ....................H04n 9/08

[58] Field of Search ....................178/5.4 M

[56] References Cited

FOREIGN PATENTS OR APPLICATIONS 1,941,237 2/1970 Germany....................178/5.4 M

*Primary Examiner*—Robert L. Griffin
*Assistant Examiner*—George G. Stellar
*Attorney*—Eugene M. Whitacre

[57] ABSTRACT

Predominantly positive and negative polarity waves formed from edge video signals, representing sharp transitions between light and dark areas of a subject and derived from two of a plurality of pickup tubes respectively responsive to different component colors of the subject, are peak detected to produce a signal having such polarity and amplitude as to so control the beam deflection in one of the tubes that the edge video signals are made to coincide in time.

14 Claims, 11 Drawing Figures

INVENTORS
Charles L. Olson and
Robert A. Dischert.
BY
ATTORNEY

INVENTORS
Charles L. Olson and
Robert A. Dischert
BY [signature]
ATTORNEY

INVENTORS
Charles L. Olson and
Robert A. Dischert.
BY [signature]
ATTORNEY

INVENTORS
Charles L. Olson and
Robert A. Dischert
BY
ATTORNEY

INVENTORS
Charles L. Olson and
Robert A. Dischert
BY
[signature]
ATTORNEY

AUTOMATIC REGISTRATION OF COLOR TELEVISION CAMERAS

BACKGROUND OF THE INVENTION

A common way of generating video signals representative of a colored subject is to project light from the subject onto a plurality (e.g., three) of camera tubes that respectively are responsive to the same number of component colors of the subject. In order that the component color pictures reproduced from the video signals developed by the camera tubes be in mutual registry throughout the entire image area it is necessary that the component color representative video signals be in time coincidence. Such time coincidence may be achieved by controlling the size, positioning and linearity of the rasters scanned by the electron beams of the camera tubes. The raster control is effected by suitably adjusting the amplitude, centering and linearity of the generally sawtooth horizontal and vertical waves by which the electron beams are deflected to scan the target electrodes of the associated camera tubes. The performance of such adjustments commonly is referred to as camera "registration".

In the past such camera registration has been achieved by manually adjusting the electron beam deflection apparatus associated with one or more of the camera tubes. Such adjustments usually are made during the camera set-up period prior to active use. While in use, however, some of the adjustments may need changing or refining. If such changes are not made, all of the component color representative video signals will not be developed in time coincidence with the result that the pictures reproduced therefrom will be out of mutual register, thereby forming a degraded composite image of the subject.

SUMMARY OF THE INVENTION

The apparatus embodying the present invention effects automatic registration of a plurality of component color camera tubes by suitably controlling the deflection of one or more of the scanning beams of the tubes by control signals developed in response to what will be called herein "edge" video signals derived from two or more of the camera tubes. The edge video signals used in the practice of the invention are those that are produced by, and are representative of, relatively sharp transitions between light and dark areas of the subject. A predominantly positive polarity wave and a predominantly negative polarity wave are produced from edge video signals derived from two camera tubes. An indicator signal, denoting the sense and magnitude of any time non-coincidence of the edge video signals, is developed from the difference between the predominantly positive and negative polarity waves and is used to produce a deflection control signal which is impressed upon the deflection control apparatus of one of the two camera tubes.

The predominantly positive polarity wave is produced by combining a single lobe wave of positive polarity with a double lobe wave, the lobes of which are of opposite polarity. The predominantly negative polarity wave is produced by combining the double lobe wave with a single lobe wave of negative polarity. In one embodiment of the invention the double and single lobe waves are developed by networks including delay lines that are responsive to the edge video signals.

In another embodiment the networks include differentiators.

In both forms of the invention the indicator signal developed from the predominantly positive and negative polarity waves controls the number of trigger pulses impressed upon a counter to produce and store the deflection control signals so that a control signal is continuously impressed upon the electron beam deflection apparatus until it is changed to a different value.

For a more specific disclosure of the invention reference may be had to the following description of a number of illustrative embodiments thereof which is given in conjunction with the accompanying drawings, of which:

Figure 9:
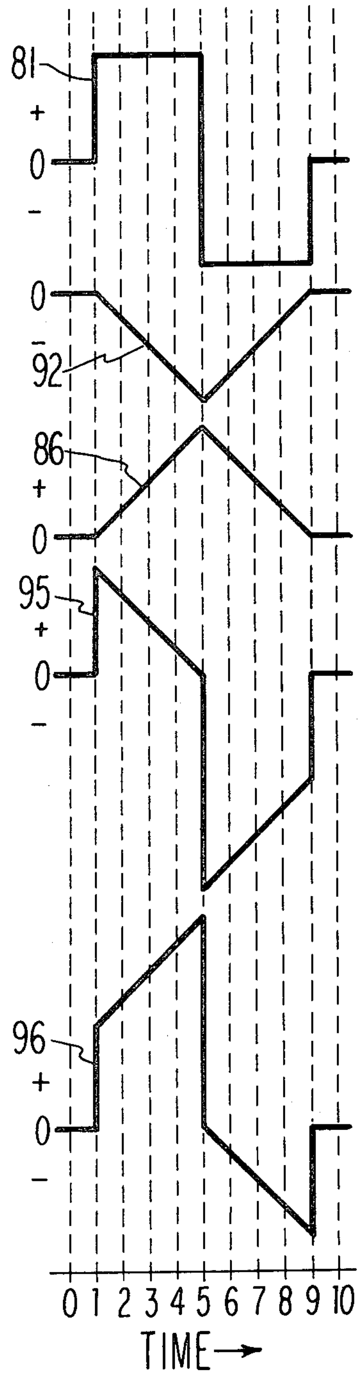
FIG. 9 is a group of idealized curves showing the formation of the predominantly positive and negative polarity waves produced from the single and double lobe waves developed by the apparatus of FIG. 8 when the edge video signals from the two camera tubes are in exact time coincidence.
Figure 10:
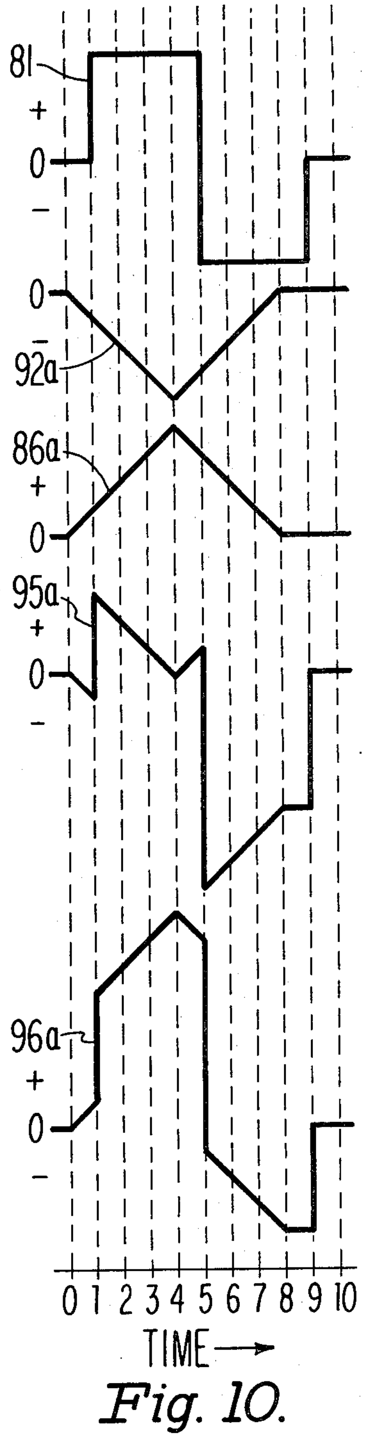
Figure 11:
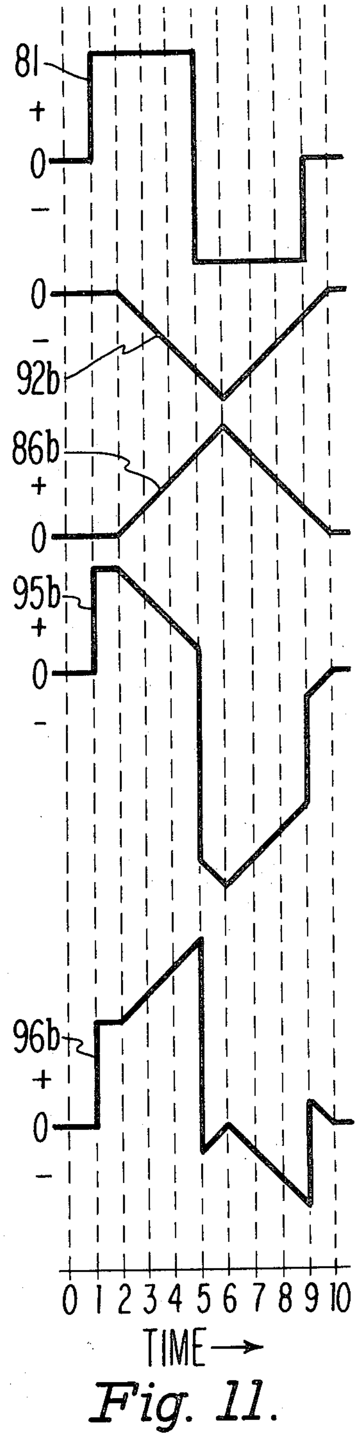

FIG. 10 is a group of idealized curves similar to those of FIG. 9 that are produced when the edge video signal from one camera tube is advanced in time relative to the edge video signal from the other camera tube; and FIG. 11 is a group of idealized curves similar to those of FIG. 9 that are produced when the edge video signal from said one camera tube is retarded in time relative to the edge video signal from the other camera tube.

DESCRIPTION OF THE INVENTION

Figure 1:
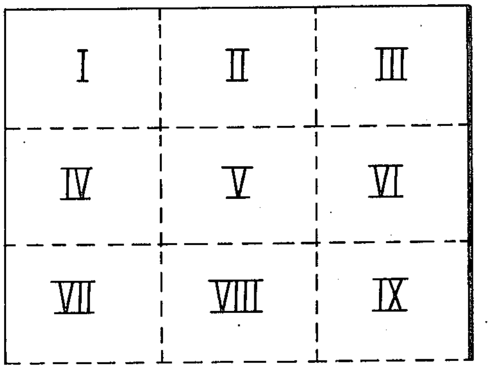
FIG. 1 is a diagram of the image area of a camera tube indicating the different zones thereof from which the edge video signals are derived to produce the deflection control signals by which complete camera registration is achieved by use of the present invention.

In order to describe how the apparatus embodying this invention functions to automatically effect complete camera registration the image area of each camera tube that is scanned by a video signal-generating electron beam is effectively divided into nine zones as shown in FIG. 1. First, horizontal and vertical centering is achieved by comparing the relative positions of vertical and horizontal edges respectively in the central zone V. Once this is accomplished, errors in vertical edge positions in zones IV and VI indicate horizontal size (width) and linearity errors. Also, comparison of horizontal edge positions in zones II and VIII enable the determination of vertical size (height) and linearity errors. Similarly, any displacement between horizontal edges in zones IV and VI is a measure of any relative raster skew.

Figure 2:
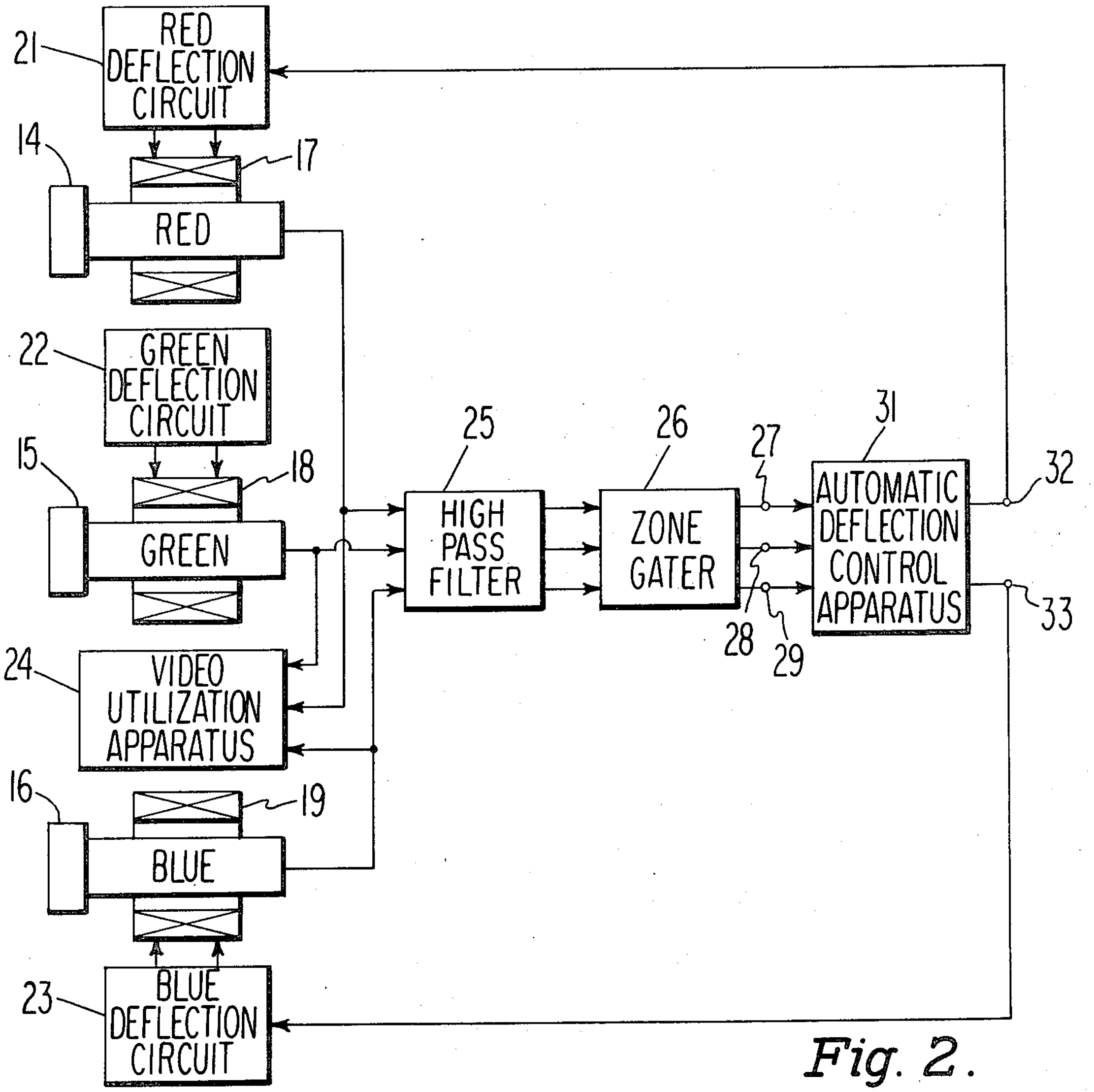
FIG. 2 is a block diagram of a three-camera registration system employing the invention.

In FIG. 2 the television color camera to be automatically registered by means of apparatus embodying this invention comprises three pickup tubes 14, 15 and 16 responsive respectively to the red, green and blue component colors of the subject. The tubes 14, 15 and 16 have respective deflection yokes 17, 18 and 19 driven by associated deflection circuits 21, 22 and 23 to cause the electron beams (not shown) of the tubes to scan substantially rectangular rasters at the target electrodes of the tubes, thereby to generate red, green and blue component color representative video signals. These signals are impressed upon video signal utilization apparatus 24 by which they are processed in a known manner to produce a color television signal suitable for transmission to one or more receivers for the reproduction of a picture of the subject.

The video signals derived from the camera tubes 14, 15 and 16 also are impressed upon a high pass filter 25 which effectively removes from the signals substantially all frequency components except those constituting the edge video signals representing relatively sharp transitions between light and dark areas (edges) of the subject. The red, green and blue edge video signals derived from the filter 25 are applied to a zone gater 26 which functions to pass only the edge video signals from selected ones of the image zones of FIG. 1. The selected red, green and blue edge video signals derived from the gater 26 appear at terminals 27, 28 and 29 that serve as the input terminals of the automatic deflection control apparatus 31 comprising this invention. Details of two illustrative embodiments of this apparatus will be disclosed later.

In order to register three camera tubes with one another it is only necessary to control the deflection apparatus of two of them so as to match the third tube. Accordingly, in the illustrative embodiments of the invention disclosed herein the edge video signal from the green tube 15 is taken as standard and the edge video signals from the red and blue tubes 14 and 16 are compared to the green signal to develop deflection control signals for the red and blue tubes. The red and blue deflection control signals produced by the automatic control apparatus 31 at the output terminals 32 and 33 are impressed respectively upon the red and blue deflection circuits 21 and 23. The control apparatus 31 comprises an indicator signal developer of FIG. 3 and a deflection control signal generator of FIG. 4.

Figure 3:
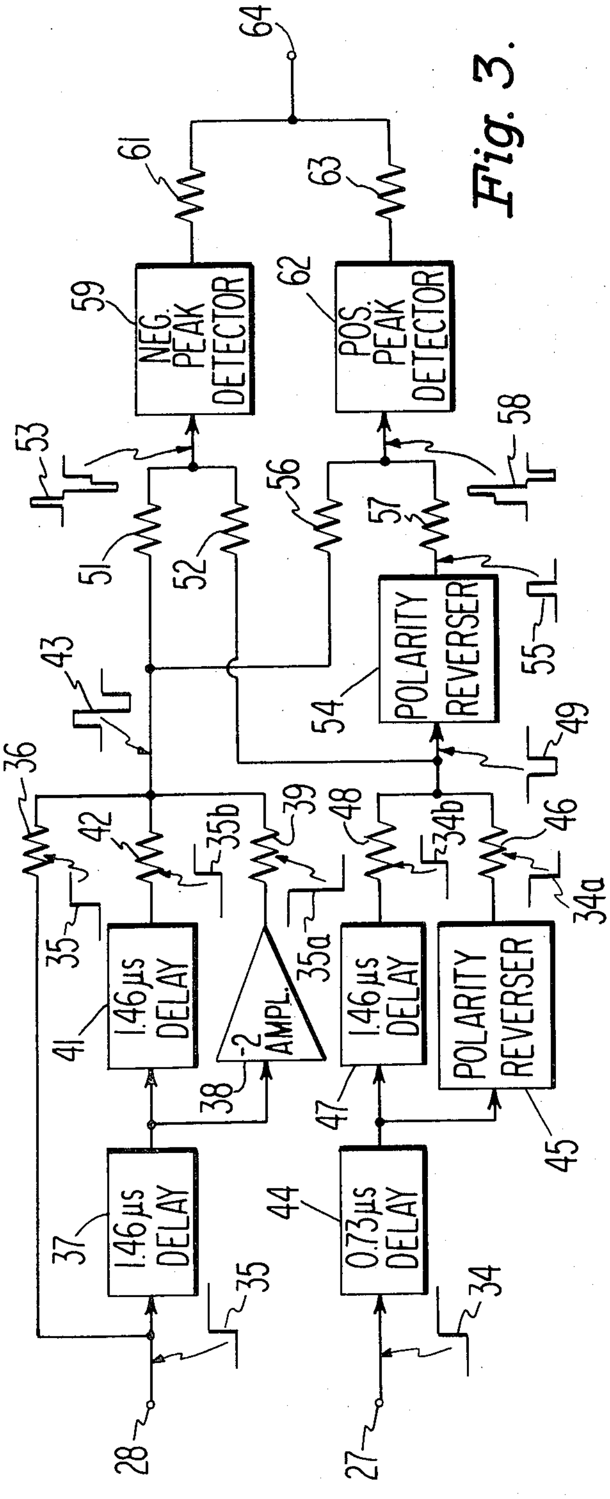
FIG. 3 is a block diagram of the indicator signal-developing part of the automatic deflection control apparatus of FIG. 2 using delay lines to form the double and single lobe waves.

The apparatus of FIG. 3 illustrates one way of developing an indicator signal denoting the time relationship of two edge video signals derived respectively from the green camera tube 15 and one other camera tube such as the red tube 14 of FIG. 1. It will be understood that similar apparatus is used to develop a green-blue timing relationship indicator signal. In FIG. 3 red and green edge video signals 34 and 35 are impressed upon the respective input terminals 27 and 28 of the deflection control apparatus 31 (FIG. 2). The green signal 35 is applied to a signal combining resistor 36 and also to a full period delay device 37. The delay period may vary with the type of video signals employed. In the case of edge video signals representing vertical edges of the subject the apparatus of FIG. 3 has been used successfully with a full delay period of approximately 1.46 microseconds. The green signal derived from the delay device 37 is doubled in amplitude and reversed in polarity by an amplifier 38 and is impressed as a component **35*a* upon a signal-combining resistor 39. The green signal derived from the delay device 37 also is delayed for another full period by a delay device 41 from which it is impressed upon a signal-combining resistor 42 as a component 35*b*. The signal-combining resistors 36, 39 and 42 are connected together at a common output terminal to form a double lobe wave 43 from the components 35, 35*a* and 35*b***.

The red edge video signal 34 at the input terminal 27 is applied to a half period delay device 44 which, in the case of the red edge video signal 34 representing a vertical edge, was 0.73 microseconds. The signal derived from the delay device 44 is reversed in polarity by a polarity reverser 45 and impressed as a component **34*a* upon a signal-combining resistor 46. The red signal derived from the delay device 44 also is delayed for a full period by a delay device 47 from which it is applied to a signal-combining resistor 48 as a component 34*b*. The signal-combining resistors 46 and 48 are connected together at a common terminal to form a single lobe wave 49** of negative polarity.

The double lobe wave 43 and the negative polarity single lobe wave 49 are impressed upon respective signal-combining resistors 51 and 52 which have a common output terminal at which a predominantly negative polarity wave 53 is developed. The negative polarity single lobe wave 49 also is impressed upon a polarity reverser 54 which produces a positive polarity single lobe wave 55. The double lobe wave 43 and the positive polarity single lobe wave 55 are combined by signal-combining resistors 56 and 57 to produce a predominantly positive polarity wave 58.

The impression of the predominantly negative polarity wave 53 upon a negative peak detector 59 produces a representative unidirectional signal of negative polarity that is applied to a signal-combining resistor 61. Similarly, a positive peak detector 62 produces a representative unidirectional signal of positive polarity from the predominantly positive polarity wave 58 and applies it to a signal-combining resistor 63. The resistors 61 and 63 are connected together at a common output terminal 64 so as to produce at that terminal an indicator signal having a polarity that indicates the sense of any time non-coincidence of the red and green edge video signals 34 and 35, and an amplitude representative of the magnitude of any time non-coincidence.

Figure 4:
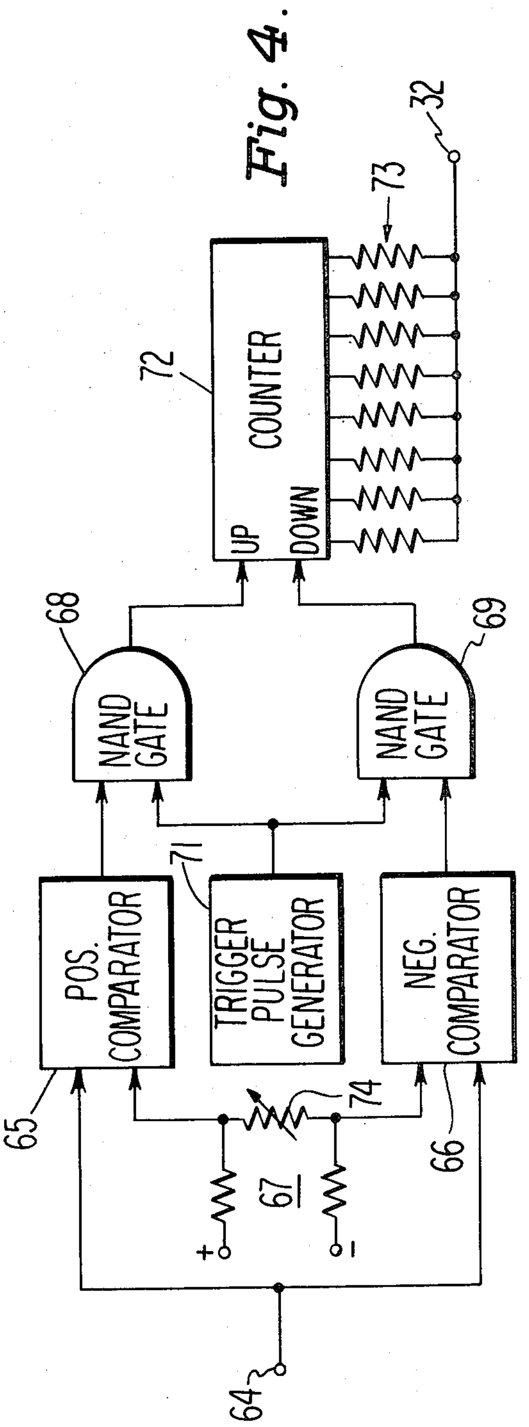
FIG. 4 is a functional diagram of the control signal-developing and storage part of the automatic deflection control apparatus of FIG. 2.

In FIG. 4 the indicator signal developed by the apparatus of FIG. 3 at the terminal 64 is impressed upon respective positive and negative comparators 65 and 66. Positive and negative comparison voltages are applied to the respective comparators 65 and 66 from a voltage divider 67. Any excess of a positive polarity indicator signal at the terminal 64 over the positive comparison voltage causes the comparator 65 to apply an activating signal to a NAND gate 68. Similarly, an activating signal is applied to another NAND gate 69 by the comparator 66 in response to an indicator signal of negative polarity that exceeds the negative comparison voltage applied to this comparator by the voltage divider 67.

Activation of the NAND gate 68 causes trigger pulses from a generator 71 to be applied to the "up" control terminal of an up-down counter 72. Likewise, the activation of the NAND gate 69 causes the trigger pulses to be applied to the "down" terminal of the counter 72. A deflection control signal is produced by the counter 72 at the output terminal 32 of the automatic deflection control apparatus 31 (FIG. 2) from which it is applied to the red deflection circuit 21 (FIG. 2) as previously described.

A deflection control signal-producing counter 72 of FIG. 4 is a multistage device having a plurality of output resistors 73 which are energized in different combinations depending upon the point reached in the counter by the trigger pulses applied to its "up" and "-down" terminals. In a successfully operated embodiment of the invention the counter 72 was an eight bit device. Such a device effectively counts the number of trigger pulses impressed upon it and the resultant binary number so produced is analoged by the eight resistor matrix 73 so that 256 different values of deflection control signals are produced at the terminal 32. In operation the counter is set approximately at the middle of its range for a condition of time coincidence of the respective red and green edge video signals 34 and 35. In a manner to be described presently any difference in the time relationship of these video signals causes the counter 72 to count up or down from its range center to produce an appropriate deflection control signal by which to effect time coincidence of the video signals.

The small positive and negative voltages that are applied from the voltage divider 67 to the respective positive and negative comparators 65 and 66 are for the purpose of preventing the apparatus of FIG. 4 from hunting. Any indicator signal applied to the terminal 64 must have sufficient amplitude to exceed the voltages impressed upon the comparators 65 and 66 by the voltage divider 67. The magnitude of these voltages may be adjusted by a potentiometer 74 forming part of the voltage divider. Such offsetting of the action of the comparators 65 and 66 produces a small dead zone in which small indicator signals produce no change of the deflection control signal. The dead zone is so small, however, that no perceptible error occurs in the reproduced picture. The storage feature with such a dead zone provides stability for the deflection control system when one or both edge video signals is absent such as when the camera is capped for example.

Figure 5:
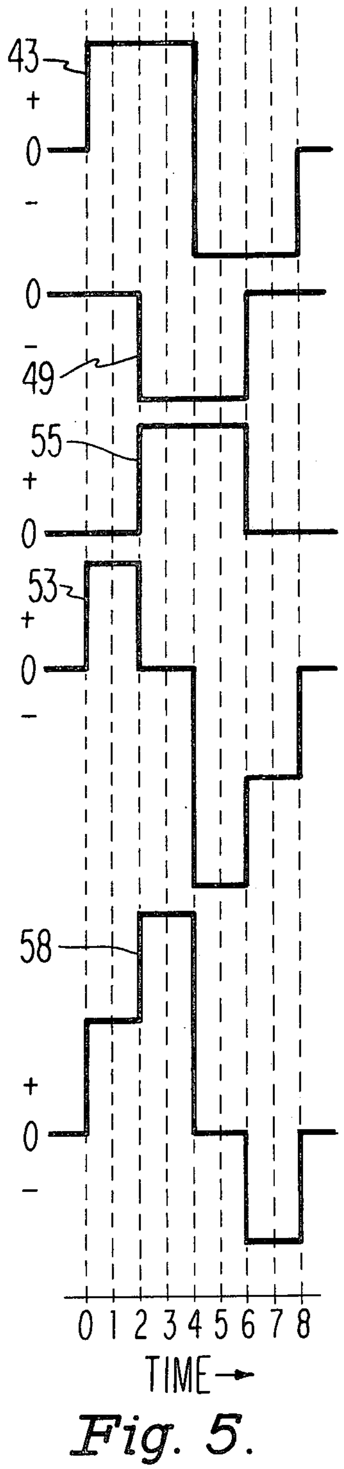
FIG. 5 is a group of idealized curves showing the formation of the predominantly positive and negative polarity waves from the single and double lobe waves produced by the apparatus of FIG. 3 when the edge video signals from two of the camera tubes are in exact time coincidence.

The idealized curves of FIG. 5 illustrate the manner in which the apparatus of FIG. 3 functions to produce the predominantly negative and positive polarity waves 53 and 58 respectively when the red and green edge video signals 34 and 35 are coincident in time. In order to achieve clarity in explaining the operation of this apparatus the curves of this figure (and of FIGS. 6, 7, 9, 10 and 11 subsequently discussed) are idealized but nevertheless represent the general forms of the waves produced in practice. Considering that the double lobe wave 43 occurs in an eight unit time interval from time 0 to time 8 it is seen that the single lobe waves 49 and 55 occur in the interval from time 2 to time 6. This time relationship is established by the half period delay device 44 (FIG. 3). The described combinations of these waves produces the predominantly negative and positive polarity waves 53 and 58 respectively in which it is to be noted that the negative portion of the wave 53 is equal to the positive portion of the wave 58. When the waves 53 and 58 are processed by the respective negative and positive peak detectors 59 and 62 of FIG. 3 no indicator signal is developed at the terminal 64. Hence, no change is made by the apparatus of FIG. 4 in the deflection control signal at the output terminal 32 of the counter 72. Accordingly, no change is made in the control of the red deflection circuit 21 of FIG. 2.

Figure 6:
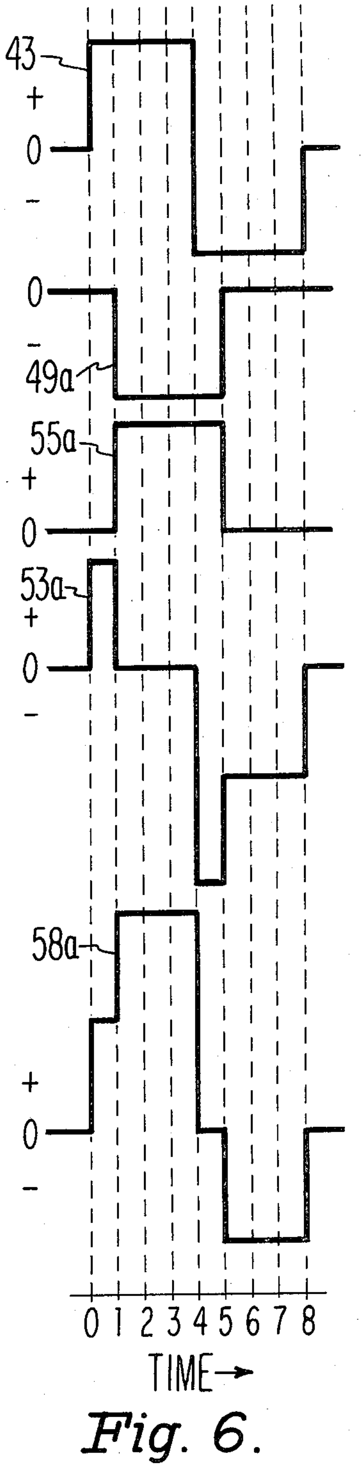
FIG. 6 is a group of idealized curves similar to those of FIG. 5 that are produced when the edge video signal from one camera is advanced in time relative to the edge video signal from the other camera tube.

With reference now generally to FIG. 6 assume that the red edge video signal 34 procedes the green edge video signal 35 (FIG. 3) by one time unit. Being taken as the standard the double lobe wave 43 produced from the green edge video signal occurs in the interval from time 0 to time 8 as in the case of the curves of FIG. 5. The single lobe waves 49*a* and 55*a* produced from the red edge video signal, however, are advanced so that they occur in the interval between time 1 and time 5. When these waves are combined to form the waves 53*a* and 58*a* it is seen that the predominantly negative polarity wave 53*a* is less negative than the wave 53 of FIG. 5 and the predominantly positive polarity wave 58*a* is more positive than the wave 58 of FIG. 5. The processing of the waves 53*a* and 58*a* by the respective peak detectors 59 and 62 of FIG. 3 develops at the terminal 64 an indicator signal of positive polarity denoting the advance of the red edge video signal 34 relative to the green edge video signal 35 (FIG. 3). The amplitude of the indicator signal at the terminal 64 is a function of the magnitude of the difference between the negative portion of the wave 53*a* and the positive portion of the wave 58*a*.

In the apparatus of FIG. 4 such an indicator signal effects the opening of the NAND gate 68 which allows the trigger pulse from the generator 71 to be applied to the "up" terminal of the counter 72. The resultant change in the deflection control signal produced at the terminal 32, when applied to the red deflection circuit 21 of FIG. 2, retards the beam deflection in the red camera tube 14 so as to decrease the time difference between the red and green edge video signals 34 and 35. Such a decrease is detected by the apparatus of FIG. 3 to decrease the amplitude of the indicator signal at the terminal 64 which, in turn, causes the apparatus of FIG. 4 to further change the deflection control signal at terminal 32. This process continues in the same manner until substantial coincidence between the red and green edge video signals 34 and 35 is achieved.

Figure 7:
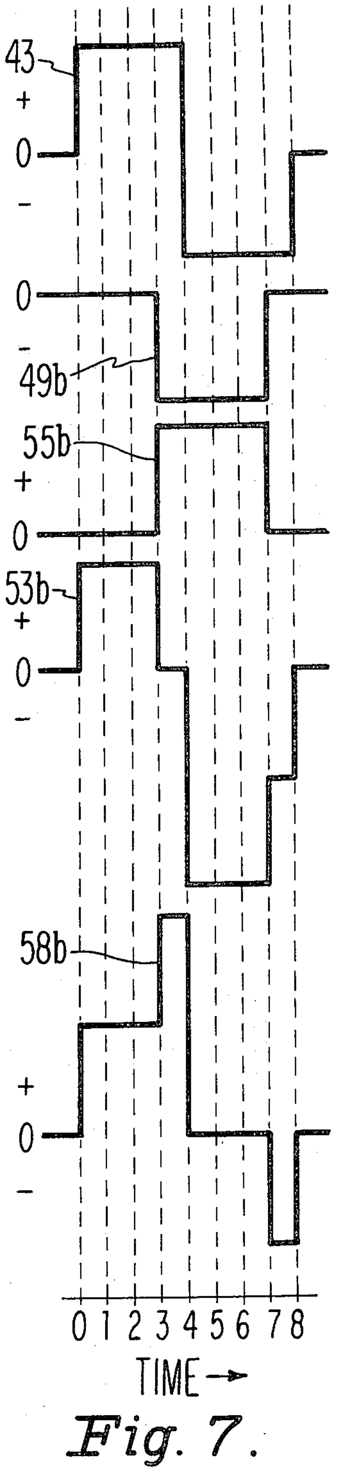
FIG. 7 is a group of idealized curves similar to those of FIG. 5 that are produced when the edge video signal from said one camera tube is retarded in time relative to the edge video signal from the other camera tube.

If the red edge video signal 34 becomes retarded relative to the green edge video signal 35 (FIG. 3) by one time unit, the idealized curves of FIG. 7 illustrate such a condition. With the double lobe wave 43 as standard occurring in the interval from time 0 to time 8 the single lobe waves 49*b* and 55*b* occur in the interval from time 3 to time 7. The predominantly negative polarity wave 53*b* formed from the waves 43 and 49*b* is more negative than the wave 53 of FIG. 5. Also, the predominantly positive polarity wave 58*b* is less positive than the wave 58 of FIG. 5. The resultant indicator signal developed at the terminal 64 of FIG. 3 thus is of negative polarity denoting the retardation of the red edge video signal 34 relative to the green edge video signal 35 of FIG. 3.

Such an indicator signal causes the operation of the NAND gate 69 of FIG. 4, thereby impressing trigger pulses from the generator 71 upon the "down" terminal of the counter 72. The resulting change in the deflection control signal produced at the counter output terminal 32 effects a correction of the red deflection circuit 21 (FIG. 2) opposite to that produced by the described control signal representative of an advance of the red edge video signal relative to the green edge video signal.

Figure 8:
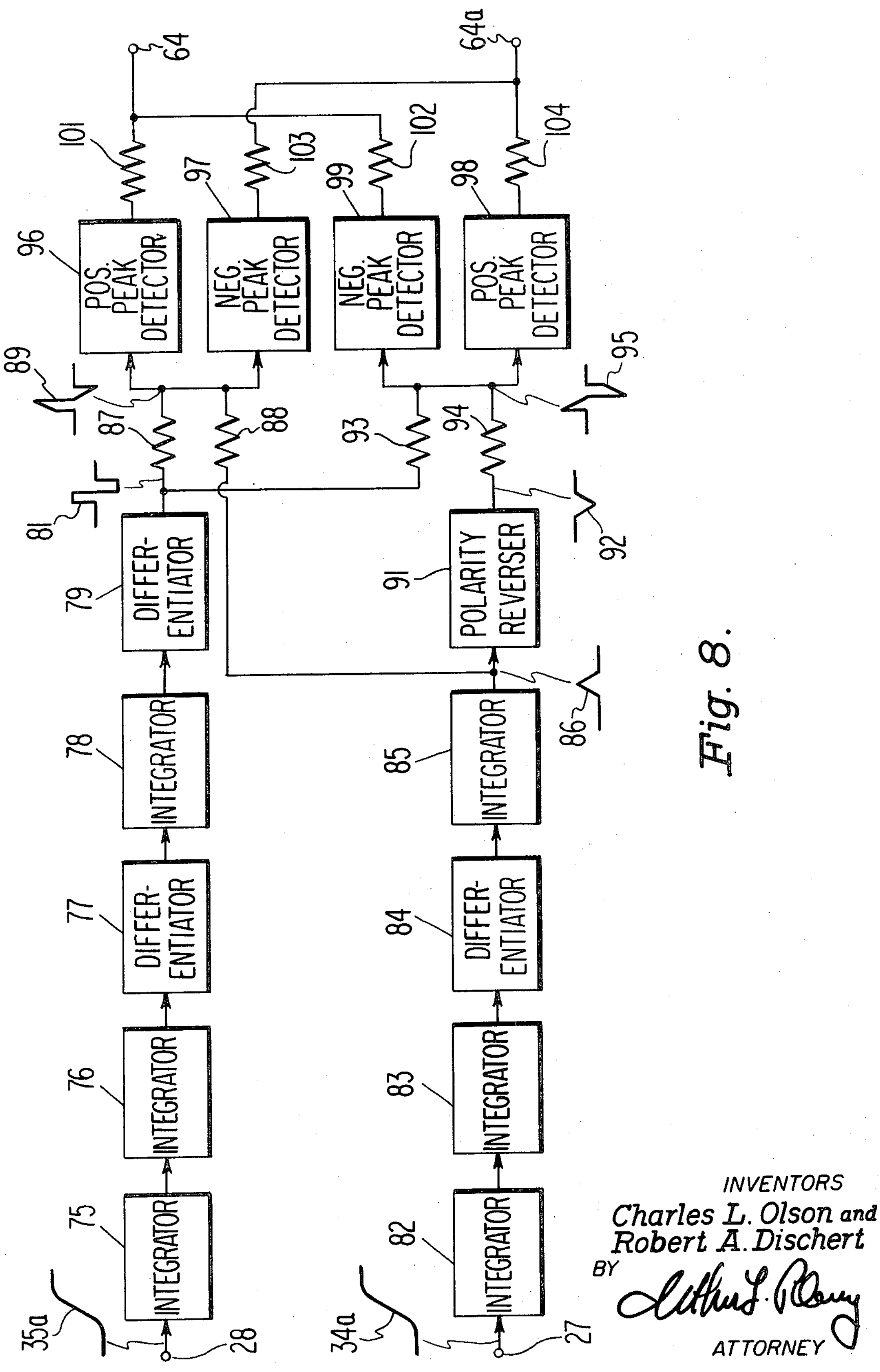
FIG. 8 is a block diagram of another embodiment of the indicator signal-developing part of the automatic deflection control apparatus of FIG. 2 using differentiators to form the double and single lobe waves.

Another embodiment of the invention is shown in FIG. 8. In this apparatus a green edge video signal 35*a* is impressed upon a series arrangement of two integrators 75 and 76, a first differentiator 77, another integrator 78 and a second differentiator 79. The two differentiators 77 and 79 effectively develop from the video signal 35*a* a double lobe wave 81 which is similar to the wave 43 of FIG. 3. The function of the integrators 75 and 76 is to substantially remove any noise or other spurious effects from the video signal 35*a* before it is first differentiated by the differentiator 77. The integrator 78 performs a similar function. It should be noted that the particular order in which the integrators 75, 76 and 78 and the differentiators 77 and 79 are connected in the series arrangement is not critical to the successful operation of the apparatus of FIG. 8.

The red edge video signal 34a is impressed upon a series arrangement of two integrators 82 83, a differentiator 84 and another integrator 85. The single differentiation of the video signal 34a produces a single lobe wave 86 of positive polarity. The integrators 82, 83 and 85 perform substantially the same functions as in the green signal wave shaper previously described. The three integrators 82, 83 and 85 are provided with this apparatus even though only one differentiator 84 is used in order that the time delay in the red signal-processing apparatus be substantially equal to that in the green signal-processing apparatus.

The double lobe wave 81 and the positive polarity single lobe wave 86 are impressed upon respective signal-combining resistors 87 and 88 by which to produce a predominantly positive polarity wave 89. The positive polarity single lobe wave 86 is converted by a polarity reverser 91 into a negative polarity single lobe wave 92. The double lobe wave 81 and the negative polarity single lobe wave 92 are impressed upon respective signal-combining resistors 93 and 94 by which a predominantly negative polarity wave 95 is produced.

The predominantly positive polarity wave 89 is impressed upon positive and negative peak detectors 96 and 97 which respectively respond to the positive and negative polarity portions of this wave. Also, the predominantly negative polarity wave 95 is impressed upon positive and negative peak detectors 98 and 99 which respectively respond to the positive and negative polarity portions of this wave.

As in the previously described embodiment of FIG. 3 the respective outputs of the positive and negative peak detectors 96 and 99 are combined by interconnecting resistors 101 and 102 to the output terminal 64 to produce thereat an indicator signal. An alternate or auxiliary indicator signal may be produced by interconnecting the respective outputs of the negative and positive peak detectors 97 and 98 to an auxiliary terminal 64a through resistors 103 and 104.

The manner in which the apparatus of FIG. 8 functions to develop the predominantly positive and negative polarity waves 89 and 95 respectively for different time relationships of the red and green edge video signals 34*a* and 35*a* is illustrated by the idealized curves of FIGS. 9, 10 and 11. In FIG. 9 the exact time coincidence of these signals results in the production of the double lobe wave 81 in the interval between time 1 and time 9. Also, the single lobe waves 86 and 92 of positive and negative polarity respectively are produced in the same time interval. The described combinations of these waves develops the predominantly positive and negative polarity waves 95 and 96 in which the respective positive and negative portions thereof are equal. Thus, no indicator signal is produced at the output terminals 64 and 64*a* of the FIG. 8 apparatus and no change is made in the red deflection circuit 21 of FIG. 2.

When the red edge video signal 34*a* procedes the green edge video signal 35*a* of FIG. 8 by one time unit the single lobe waves 86*a* and 92*a* of FIG. 10 occur in the interval between time 0 and time 8 while the standard double lobe wave 81 occurs in the interval between time 1 and time 9 as in the previously described FIG. 9. Both positive and negative polarity portions of the predominantly negative polarity wave 95*a* are less than the corresponding portions of the wave 95 of FIG. 9. Also, the positive and negative polarity portions of the predominantly positive polarity wave 96*a* are greater than the corresponding portions of the wave 96 of FIG. 9. As a consequence, substantially equal amplitude positive and negative polarity indicator signals are developed at the respective output terminals 64 and 64*a* of the apparatus of FIG. 8. The suitable impression of either one of these indicator signals upon apparatus similar to that of FIG. 4 produces a deflection control signal which, when applied to the red deflection circuit 21 of FIG. 2 effects restoration of time coincidence of the red and green edge video signals.

As depicted in FIG. 11 a one unit retardation of a red edge video signal relative to a green edge video signal effects the production of the positive and negative single lobe waves 86*b* and 92*b* in the interval between time 2 and time 10 while the double lobe wave 81 remains in the interval between time 1 and time 9. It is seen that the positive and negative polarity portions of the predominantly negative polarity wave 95*b* are greater than the corresponding portions of the wave 95 of FIG. 9. Also, the different polarity portions of the predominantly positive polarity wave 96*b* are less than the corresponding portions of the wave 96 of FIG. 9. The result of these differences between the waves 95*b* and 96*b* is the production of substantially equal amplitude negative and positive polarity indicator signals at the respective output terminals 64 and 64*a* of the apparatus of FIG. 8. Apparatus similar to that of FIG. 4 functions in response to such an indicator signal to develop an appropriate deflection control signal for impression upon the red deflection circuit 21 of FIG. 2 to restore time coincidence of the red and green edge video signals.

Although the foregoing description has dealt with the manner in which the red deflection circuit 21 of FIG. 2 is automatically controlled to effect registration of the red and green tubes 14 and 15 of the camera, it is to be understood that similar apparatus is used to achieve registration of the blue and green tubes 16 and 15 so that complete camera registration is attained. The functions of raster centering, size and linearity are performed by adjusting the generally sawtooth deflection waveforms in the usual ways. In accordance with this invention these adjustments are made automatically by control signals instead of by manual means as previously done. Raster centering, for example, is accomplished by having the automatic control signal suitably adjust a direct current component of the horizontal and/or vertical sawtooth deflection wave. Size control is achieved by a control signal adjustment of the amplitude of either one or both of the deflection waves. Also, a suitably shaped component is added to the proper deflection wave in response to an automatic control signal to effect a linearity correction.

Various modifications and alterations of the illustratively disclosed apparatus are considered to be within the purview of the invention. As one example, the edge video signals from either the red tube 14 or the blue tube 16 of FIG. 2 may be used in the system as a standard instead of the edge video signals from the green tube 15. Also, advantage may be taken of the control signal storage facility of FIG. 4 by time-sharing the peak detectors, such as the detectors 59 and 62 of FIG. 3, among two or more of the functions of raster centering, size and linearity adjustments.

What is claimed is:

1. In a color television video signal-generating system including a plurality of camera tubes receiving respective images representing a plurality of component colors of a subject and scanned by respective electron beams, automatic beam deflection control apparatus for effecting the production from all of said camera tubes of video signals which simultaneously represent the same elements of said respective component color images, said apparatus comprising:
   - wave-producing means responsive to edge video signals derived from two selected ones of said camera tubes and representative of a relatively sharp transition between light and dark areas of said subject for developing a first predominantly negative polarity wave and a second predominantly positive polarity wave, both being indicative of the timing relationship of said edge video signals from said respective selected camera tubes;
   - differencing means responsive to said predominantly positive and negative waves to produce an indicator signal having a polarity indicating the sense of any time non-coincidence of said edge video signals from said respective selected camera tubes, and an amplitude indicating the magnitude of any time non-coincidence;
   - deflection control signal-producing means responsive to said indicator signal to produce a beam deflection control signal; and
   - means for impressing said control signal upon said beam deflection control apparatus of one of said selectedcamera tubes to effect time coincidence of said edge video signals derived from said respective selected tubes.

2. Automatic beam deflection control apparatus as defined in claim 1, wherein:
   - said wave-producing means comprises;
   - first wave-shaping means responsive to said edge video signal derived from a first one of said selected camera tubes for producing a double lobe wave, said lobes being of opposite polarity and occurring respectively in two consecutive time periods,
   - second wave-shaping means responsive to said edge video signal derived from a second one of said selected camera tubes for producing two single lobe waves, the respective lobes of which being substantially equal to one another and of opposite polarity and respectively occurring in the same time period,
   - first wave-combining means for combining said double lobe wave with said single lobe wave of positive polarity to produce said predominantly positive polarity wave, and
   - second wave-combining means for combining said double lobe wave with said single lobe wave of negative polarity to produce said predominantly negative polarity wave.

3. Automatic beam deflection control apparatus as defined in claim 2, wherein:
   - said differencing means comprises;
   - means including a positive peak detector responsive to said predominantly positive polarity wave to produce a first component of said indicator signal,
   - means including a negative peak detector responsive to said predominantly negative polarity wave to produce a second component of said indicator signal, and
   - means for combining said first and second indicator signal components to produce said indicator signal.

4. Automatic beam deflection control apparatus as defined in claim 3, wherein:
   - said deflection control signal-producing means comprises;
   - signal storage means operative to maintain impression upon said deflection control apparatus of a produced control signal until a different control signal is produced.

5. Automatic beam deflection control apparatus as defined in claim 4, wherein:
   - said signal storage means include;
   - an up-down counter responsive to respective up and down pulses to oppositely alter the magnitude of said deflection control signal.

6. Automatic beam deflection control apparatus as defined in claim 5, wherein:
   - said signal storage means also includes;
   - a trigger pulse generator and a pair of gates separately operable to impress pulses from said generator upon said counter as said up and down pulses respectively.

7. Automatic beam deflection control apparatus as defined in claim 6, wherein:
   - said signal storage means further includes;

polarity comparison means responsive to an indicator signal of one polarity for operating one of said gates and responsive to an indicator signal of opposite polarity for operating the other of said gates.

8. Automatic beam deflection control apparatus as defined in claim 2, wherein:

said first wave-shaping means comprises;

means for developing said edge video signal derived from said first selected camera tube as a first component of said double lobe wave, means responsive to said edge video signal derived from said first selected camera tube and including a series arrangement of a first delay line and a polarity reversing and amplitude doubling amplifier for producing a second component of said double lobe wave, means responsive to said edge video signal derived from said first camera tube and including a series arrangement of said first delay line and a second like delay line for producing a third component of said double lobe wave, and means for combining said first, second and third components to produce said double lobe wave.

9. Automatic beam deflection control apparatus as defined in claim 8, wherein:

said second wave-shaping means comprises;

means responsive to said edge video signal derived from said second selected camera tube and including a series arrangement of a third delay line, having one-half the delay period of said first and second delay lines, and a polarity reverser for producing a first component of one of said single lobe waves, means responsive to said edge video signal derived from said second selected camera tube and including a series arrangement of said third delay line and a fourth delay line, like said first and second delay lines, for producing a second component of one of said single lobe waves, means for combining said first and second single lobe wave components to produce one of said single lobe waves, and means responsive to said one single lobe wave and including a polarity reverser for producing the other of said single lobe waves.

10. Automatic beam deflection control apparatus as defined in claim 2, wherein:

said first wave-shaping means comprises;

first and second differentiators mutually interconnected in a series circuit and responsive to said edge video signal derived from said first selected camera tube for producing said double lobe wave.

11. Automatic beam deflection control apparatus as defined in claim 10, wherein:

said second wave-shaping means comprises;

a third differentiator responsive to said edge video signal derived from said second selected camera tube for producing one of said single lobe waves, and means responsive to said one single lobe wave and including a polarity reverser for producing the other of said single lobe waves.

12. Automatic beam deflection control apparatus as defined in claim 11, wherein:

integrating means is coupled to the respective outputs of said first and third differentiators.

13. Automatic beam deflection control apparatus as defined in claim 12, wherein:

integrating means is coupled to the respective inputs of said first and third differentiators.

14. Automatic beam deflection control apparatus as defined in claim 13, wherein:

said differencing means includes;

a positive peak detector and a negative peak detector responsive to said predominantly positive polarity wave to produce a first component and an alternate first component respectively of said indicator signal, a negative peak detector and a positive peak detector responsive to said predominantly negative polarity wave to produce a second component and an alternate second component respectively of said indicator signal, means for combining said first and second indicator signal components to produce said indicator signal, and means for combining said alternate first and second indicator signal components to produce an alternate indicator signal.

* * * * *